(12) United States Patent
Rimmer (10) Patent No.: US 7,822,028 B1
(45) Date of Patent: Oct. 26, 2010

(54) METHOD AND SYSTEMS FOR INFINIBAND NETWORKS

(75) Inventor: Todd M Rimmer, Exton, PA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 254 days.

(21) Appl. No.: 11/867,849

(22) Filed: Oct. 5, 2007

(51) Int. Cl.
*H04L 12/56* (2006.01)
(52) U.S. Cl. .............. 370/389; 370/231; 370/238; 370/412; 709/227; 709/238
(58) Field of Classification Search ............ 370/238, 370/401, 412, 415, 231, 229; 455/187.1; 709/227–228, 220, 238
See application file for complete search history.

(56) References Cited

U.S. PATENT DOCUMENTS

| | | | | |
|---|---|---|---|---|
| 6,493,318 B1 * | 12/2002 | Bare | | 370/238 |
| 6,683,850 B1 * | 1/2004 | Dunning et al. | | 370/231 |
| 6,760,766 B1 * | 7/2004 | Sahlqvist | | 709/227 |
| 7,493,409 B2 * | 2/2009 | Craddock et al. | | 709/238 |
| 2004/0165607 A1 * | 8/2004 | Carnevale et al. | | 370/412 |
| 2008/0081579 A1 * | 4/2008 | Chen et al. | | 455/187.1 |

* cited by examiner

*Primary Examiner*—Man Phan
*Assistant Examiner*—Mohamed Kamara
(74) *Attorney, Agent, or Firm*—Klein, O'Neill & Singh, LLP (57) ABSTRACT

Method and system for transferring a packet in an Infiniband network is provided. The method includes configuring a connection to connect a first network device to a second network device in the Infiniband network using a first path with a packet timeout duration and a second path with a packet timeout duration, the packet timeout duration of the first path being less than the timeout duration of the second path; attempting to transfer a packet using the first path; and using the second path to transfer the packet if a number of retries using the first path exceeds a maximum number of retries for the first path.

18 Claims, 5 Drawing Sheets

METHOD AND SYSTEMS FOR INFINIBAND NETWORKS

TECHNICAL FIELD

The present disclosure relates to networks, and more particularly to timeout mechanisms in Infiniband networks.

RELATED ART

Network systems are commonly used to move network information (may also be referred to interchangeably, as frames, packets or commands) between computing systems (for example, servers) or between computing systems and network devices (for example, storage systems). Various hardware and software components are used to implement network communication, includi network switches.

Infiniband ("IB") is an industry standard for networks comprised of computers and/or input/output (I/O) devices. IB is typically being used in the High Performance Computing (HPC) environment. HPC environments typically create clusters of computers, with high performance characteristics. Large-scale HPC systems often encompass hundreds and even thousands of interconnected computers all working in parallel solve complex problems.

It is desirable to have low latency and rapid error recovery for computer networks in general and IS networks in particular (for example, in HPC environment). IB networks typically use short duration for packet error recovery timeouts and rapid retry of failed packets.

The term "packet timeout duration" "packet timeout") means the time a packet can wait for acknowledgement of reception before being considered lost. The term "retry" means that a system attempts to re-send a packet after the packet has been considered lost due to a timeout or a negative reception acknowledgement.

The term "total timeout duration" (or total timeout) means packet timeout multiplied by maximum number of "retries" plus one.

The IB standard permits one packet timeout duration and a specific retry count per connection path. The IB standard limits the retry count to a maximum of 7 retries, i.e. an IB based Host Channel Adapter can only retry 7 times to send a packet before the packet is considered failed. Such failed packets may cause a connection path to be considered as a failed connection path as well. In a HPC environment, the failure of a connection path results in failure of an application that is using the failed connection path, which can result in performance degradation.

Typically, in a HPC environment the total timeout duration is typically short, for example, between 50-500 milliseconds. The problem occurs if the total timeout duration is too short and a loss of network connection exceeds the total timeout duration. This may occur in large computer networks, for example, if a network cable is unplugged, then the network connection may be lost for more than 500 milliseconds and in fact may run into a number of seconds. In such a situation, network connections fail and applications also fail because the packets cannot be retried for more than times, as set by the standard.

Therefore, there is a need for a better timeout mechanism in IB networks.

SUMMARY

In one embodiment, a method for transferring a packet in an Infiniband network provided. The method includes configuring a connection to connect a first network device to a second network device in the Infiniband network using a first path with a packet timeout duration and a second path with a packet timeout duration, the packet timeout duration of the first path being less than the packet timeout duration of the second path; attempting to transfer a packet using the first path; and using the second path to transfer the packet if a number of retries using the first path exceeds a maximum number of retries for the first path.

In another embodiment, a method for transferring a packet in an Infiniband network is provided. The method includes configuring a connection to connect a first network device to a second network device in the Infiniband network using a first path with a packet timeout duration and a second path with a packet timeout duration, the packet timeout duration of the first path being less than the packet timeout duration of the second path; and the first path and the second path are the same except for the packet timeout duration; attempting to transfer a packet using the first path; using the second path to transfer the packet if a number of retries using the first path exceeds a maximum number of retries for the first path; and changing from the second path back to the first path, after the second path has been used to transfer the packet for a certain duration.

In yet another embodiment, a system used in an Infiniband network for transferring packets is provided. The network includes a first network device coupled to the Infiniband network; a second network device coupled to the Infiniband network; and an application executed at the first network device configures a connection to connect the first network device to the second network device in the Infiniband network using a first path with a packet timeout duration and a second path with a packet timeout duration, the packet timeout duration of the first path being less than the packet timeout duration of the second path; wherein the first network device attempts to transfer a packet using the first path; and uses the second path to transfer the packet if a number of retries using the first path exceeds a maximum number of retries for the first path.

This brief summary has been provided so that the nature of the disclosure may be understood quickly. A more complete understanding of the disclosure can be obtained by reference to the following detailed description of the various embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the invention. The drawings include the following Figures.

DETAILED DESCRIPTION

Definitions

The following definitions are provided for convenience as they are typically (but not exclusively) used in the IB and general networking environment, implementing the various adaptive aspects described herein.

"Alternate Path Migration" (APM): APM is a feature that is defined by the IB specification. The APM feature in an IB network, allows one to migrate from a primary network path to an alternate network path when a failure occurs in the primary path.

"Packet": A group of one or more network data word(s) used for network communication. Packets are used in an IB network to send and receive information.

"Switch": A device that facilities network communication conforming to IB and other switch standards/protocols.

To facilitate an understanding of the various embodiments, the general architecture and operation of an IB based network system will be described. The specific architecture and operation of the various embodiments will then be described with reference to the general architecture of the network system.

As discussed above, IB is a switched fabric interconnect standard for servers. IB technology is typically deployed for server clusters/enterprise data centers ranging from two to thousands of nodes (i.e. computers, network devices and others). The IB standard specification is published by the Infini-Band Trade Association, and is incorporated herein by reference in its entirety.

Figure 1A:
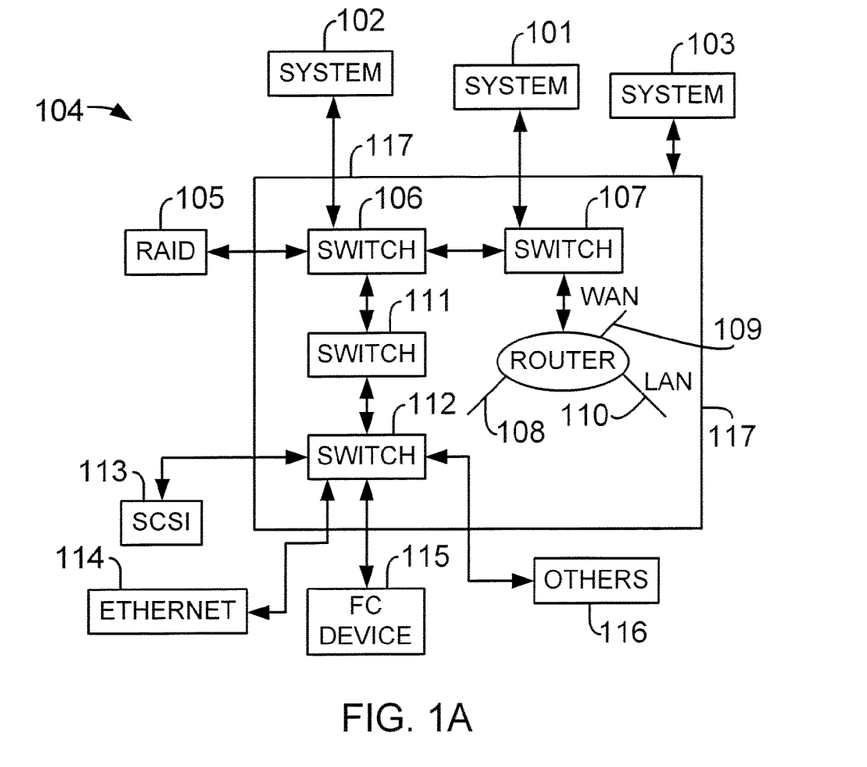
FIG. 1A shows a block diagram of a generic network system, according to one embodiment.

FIG. 1A shows a block diagram for a network system 104. System 104 includes a fabric 117, which includes plural switches 106, 107, 111 and 112 for moving network packets. Fabric 117 also includes a router 109 that is coupled to a wide area network 10Q and local area network 110.

Switch 106, 107, 111 and 112 are typically multi-port devices where each port manages a point-to-point connection between itself and an attached system. Each port can be attached to a server, peripheral, input/output subsystem, bridge, router, or another switch. The term switch as used herein includes Multi-Level switch that uses plural switching elements within a single switch chassis to route data packets.

Switch 106 is operationally coupled to a RAID storage system 105 and system 102, while system 101 and 103 may be operationally coupled to switch 107.

Switch 112 may be coupled to a small computer system interface ("SCSI") SCSI port 113 that is coupled to SCSI based devices. Switch 112 may also be coupled to an Ethernet port 114, Fibre Channel device (s) 115 and other device(s) 116.

Systems 101-103 are computing systems that typically include several functional components. These components may include a central processing unit (CPU), main memory, input/output ("I/O") devices, and streaming storage devices (for example, tape drives). In Systems 101-103, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Figure 1B:
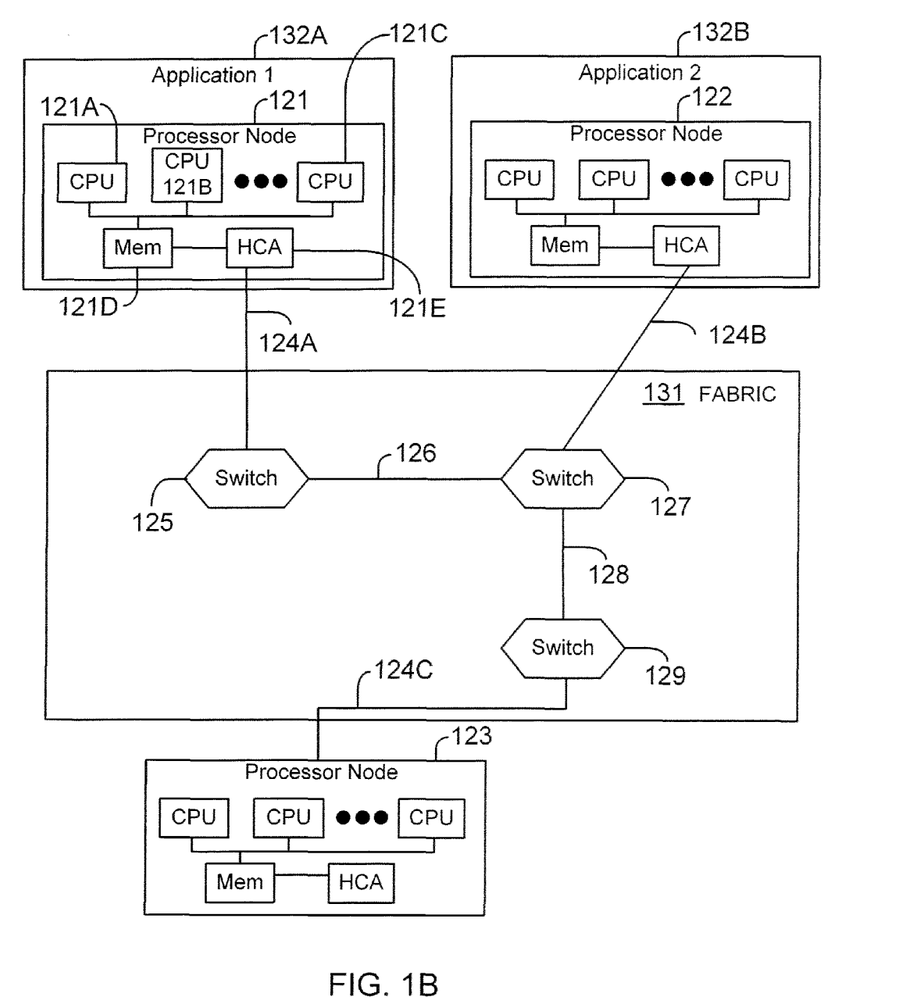
FIG. 1B shows a block diagram of an IB Fabric with various processor nodes, used according to one embodiment.

FIG. 1B shows a block diagram of an IB network with a fabric 131 coupled to a plurality of processor nodes 121, 122 and 123. Each processor node (121, 122, 123) may be a computing device that includes multiple central processing units (CPUs) interconnected to a host channel adapter (HCA) and a memory. For example, processor node 121 includes plural CPUs 121A, 121B and 121C. CPUs 121A-121C may be Pentium based provided by Intel Corporation.

Memory 121D is used to store executable computer instructions and data. HCA 121E connects processor node 121 to fabric 131 via switch 125. Although more than one CPU is shown for each processor node, the adaptive embodiments described herein are not limited to any particular number or type of CPU.

Fabric 131 includes a plurality of switches 127 and 129 that are used to interconnect processor nodes 121, 122 and 123 via physical links 124A, 124B and 124C. Processor node 121 is coupled to switch 125 via link 124A and switch 125 is coupled to switch 127 via link 126. Processor node 122 is coupled to switch 127 via link 124B. Switch 129 is coupled to switch 127. Processor node 123 is coupled to switch 129 via link 124C. Switch 129 is also coupled to switch 127 via link 128.

It is noteworthy that the configuration of fabric 131 is only being used to illustrate the adaptive embodiments described herein and is not intended to be limiting.

Software applications (shown as 132A and 132B) are executed by processor nodes to send and receive packets. Any processor node CPU (or the processor node CPU, if the processor node has only one CPU) may execute the application. As an example, application 132A runs on processor node 121 and application runs on processor node 122.

Typically, a single path may exist between two processor nodes to communicate with each other. For example, as described above processor node 121 and processor node 122 are connected via link 124A, switch 125, link 126, switch 127 and link 124B. If an intermittent failure occurs in link 124A, switch 125, switch 127 or link 124B then network communication may be disrupted resulting in packet loss.

Per the Infiniband standard, when packet loss occurs, the IB protocol attempts to resend the packets for a fixed, maximum number of times, where the maximum number of times is no larger than 7 with a fixed packet acknowledgement timeout (packet timeout duration (T)). To obtain high performance and low latency, the packet timeout duration (T) is typically short (for example, may range between 1-100 milliseconds). This means that after 8 attempts (i.e. 1 original attempt and retries) at intervals of T milliseconds, the communication will fail. This yields a Total Timeout value (total timeout value is equal to T(n+1), where n is the maximum number of retries), which is typically less than 1 second. Such failure may result in application errors and application failure.

While many intermittent conditions will resolve themselves within the 8 attempts and the available total timeout duration, there are conditions, which may not resolve and may need more time for recovery (for example, loss of connection due to disconnected cables, long duration network congestion, and other conditions etc). The adaptive embodiments described herein solve this problem by using APM, as described below.

Figure 1C:
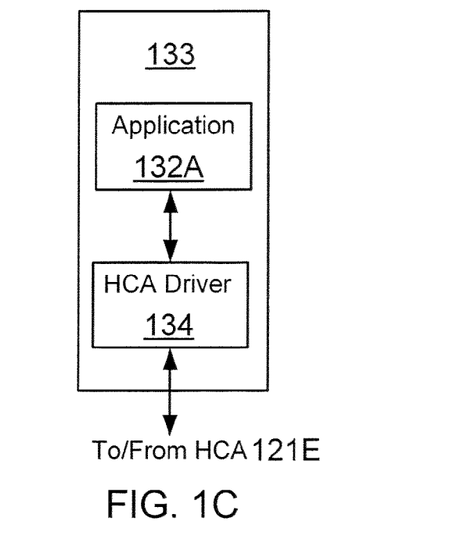
FIG. 1C shows a block diagram of a software architecture used according to one embodiment.

FIG. 1C shows a top-level block diagram of the software architecture 133 used at a processor node (for example, processor node 121), according to one embodiment. Application 132A is executed at processor node 121. Driver 134 interfaces with HCA 121F to communicate with switch 125.

Application 132A configures driver 134 to use more than one path (i.e. a primary path and an alternate path) to communicate with another node, if the primary path has failed due to timeout or the maximum number of retries have been exhausted, as described below in more detail. The primary path may have a packet timeout value of t1 and the secondary path may have a packet timeout value of t2. In one embodiment, t2 may be greater than t1. This allows an application extra time to send packets, especially for those situations where short total timeout duration may not be enough. This does not affect overall performance because the primary path continues to have a short total timeout period. The alternate path is only used in those situations where extra time is helpful to avoid packet loss.

Figure 2:
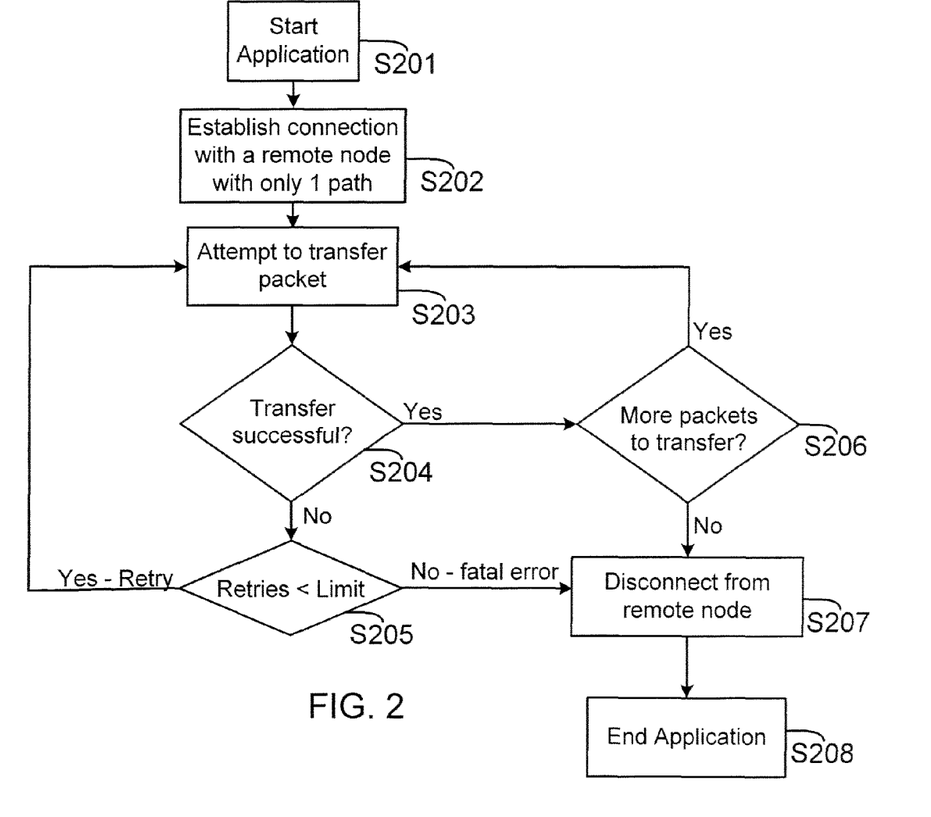
FIG. 2 shows a process flow diagram transferring packets using standard IB specification based timeout mechanism.

Before describing the use of APM, the following with respect to FIG. 2 describes the conventional process for transferring packets in an Infiniband network. The process starts in step S201, when an application is started. For example, application 132A is started at processor node 121.

In step S202, a processor node establishes a connection to another device or processor node. For example, processor 121 establishes a connection with processor node 122 via link 124A, switch 125, link switch 127 and link 124B.

In step S203, a packet is transferred from processor node 121 to processor node 122.

In step S204, the process determines if the packet is transferred successfully. If yes, then in step S206 the process determines if more packets are waiting to be delivered. If yes, then the process moves back to step S203. If there are no more packets to transfer, then the process moves to step S207, described below.

In step S204, if the packet is not transferred successfully, then in step S205 the packet is re-tried for a maximum of 7 times within a programmed duration (total timeout duration).

In step S205, if the packet is not transferred successfully after 7 re-tries, then in step S207, processor node 121 disconnects from processor node 122. A fatal error is reported back to application 132A.

In step S208, application 132A ends.

As discussed above, if recovery efforts need more time than the available total timeout duration, then the standard process fails. The embodiments described below solve the problem by using APM.

Alternate Path Migration:

The APM feature in the IB specification facilitates the use of an alternate path when a primary path fails, either by exceeding the number of retries or by exceeding the total timeout period.

In the network shown in FIG. 1B, a single path may exist between two processor nodes. For example, processor node 121 and processor node 122 may be operationally coupled using link 124A, switch 125, link 126, switch 127 and link 124B. In this case where there are no alternate physical paths between processor node 121 and processor node 122, packet loss may occur if there is a link failure, which leads to application failure.

According to an embodiment, HCA driver 134 is configured to include at least one alternate path in addition to a primary path. The alternate path may use the same physical path as the primary path but may include longer packet timeout duration than the primary path. This allows for more recovery time and therefore reduces packet loss. The process steps to increase total timeout value and the number of retries by using an alternate path are described below with respect to FIGS. 3A/3B and FIG. 4.

Figure 3A:
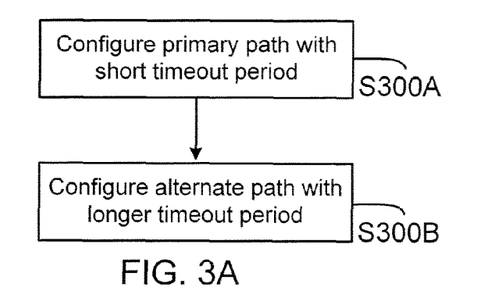
FIG. 3A shows a process flow diagram for configuring alternate connection paths, according to one embodiment.
Figure 3B:
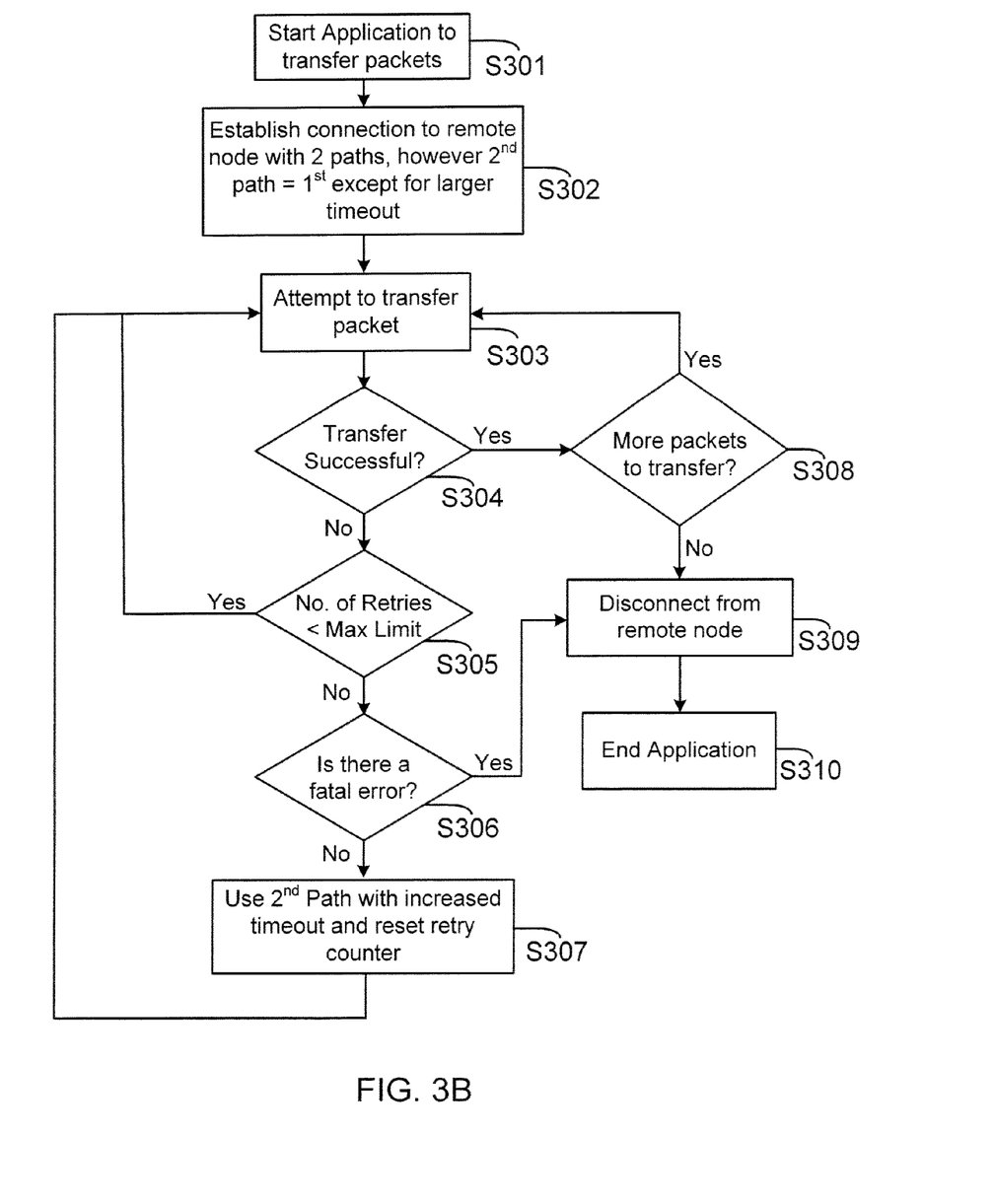
FIG. 3B and FIG. 4 show process flow diagrams for using a 2-tier timeout mechanism, according to one embodiment.

FIG. 3A shows a process flow chart for configuring an alternate path for a connection between two network nodes (for example, processor node 121 and processor node 122), according to one embodiment. The process starts in step S300A, when application 132A configures a primary path with a timeout period (t1) for sending packets. Driver 134 is notified of the primary path and the packet timeout period (t1).

In step S300B, application 132A, configures an alternate path with a packet timeout duration that is different from t1. The alternate path may include the same physical path as the primary path with different (or longer) packet timeout duration. As described above, the alternate path with the additional duration allows processor node 121 to keep trying to send packets.

It is noteworthy that although only two paths are discussed above, driver 134 may be configured to use more than two paths with different packet timeout durations to send packets.

FIG. 3B shows a process flow chart for transferring packets using the 2-tier timeout mechanism, according to one embodiment. As an example, processor node 121 sends packets to processor node 122. The process starts in step S301, when an application (132A) is started.

In step S302, processor node 121 establishes connection with processor node 122. At least two paths, a primary path and an alternate path are used for the connection (as shown in FIG. 3A). The paths may be configured by application 132A, as described above. The primary path is the standard path with short packet timeout duration (for example, 100 milliseconds). The alternate path has longer packet timeout duration (for example, 5 seconds). The only difference between the primary path and alternate path is the packet timeout duration. The timeout values may be programmed by application 132A. Application 132A and application 132B (processor node 122) exchange the timeout values when an initial connection is established between the two nodes.

In step S303, processor node 121 attempts to transfer a packet to a destination (processor node 122). If the packet transferred successfully, as determined in step S304, the process moves to step S308, where it is determined if there are more packets to send. If there are more packets to send in step S308, the process moves back to step S303, otherwise, the process moves to step S309 that is described below.

In step S304, if the packet is not transferred successfully, then in step S305, processor node 121 attempts to send the packet for a maximum of 7 times within a set duration using the primary path.

In step S305, if the packet is not transferred successfully after 7 re-tries, then in step S306, processor node 121 determines if there is a fatal error. If a fatal error has occurred, then the process moves to step S309 that is described below.

If there is no fatal error, then in step S307, the alternate path is selected. A re-try counter (not shown) is reset. The re-try counter may be implemented in hardware or software and counts the number of times a processor node has tried to send a packet. The process moves back to step S303, where the alternate path with a longer packet timeout period is used to transfer the packet and all future packets for the connection.

As described above, if there is a fatal error in step S306 (such as having exceeded retry limit for both the first and second configured paths), then in S309, processor node 121 disconnects from processor node 122. A fatal error is reported back to application 132A. Thereafter, in step S310, application 132A ends.

Figure 4:
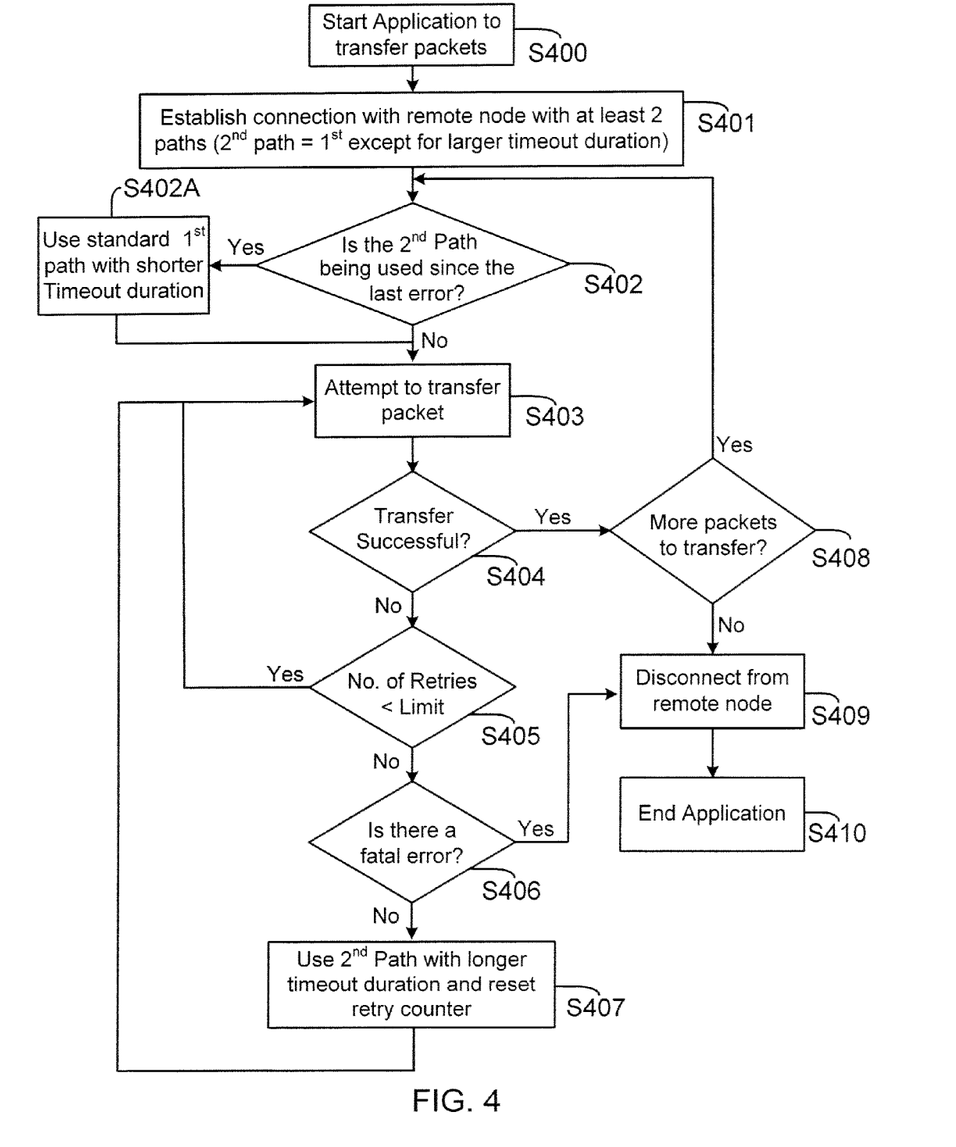

FIG. 4 shows another flow chart for transferring packets using a 2-tier timeout method, according to another embodiment. The process starts in step S400, when application 132A is started (initialized) to transfer packets.

In step S401, a processor node (for example, 121) establishes a connection with another processor node (for example, 122). The connection is established with at least with two paths, a primary path and an alternate path (as configured in FIG. 3A).

The paths may be configured by application 132A, as described above. The primary path is the standard path with short packet timeout duration (for example, 100 milliseconds). The alternate path has longer packet timeout duration (for example, 5 seconds). The only difference between the primary path and alternate path is the packet timeout duration. The timeout values may be programmed by application 132A. Application 132A and application 132B (processor node 122) exchange the timeout values when an initial connection is established between the two nodes.

In step S402, the process checks if ternate path with a longer timeout is being used for transferring packets, since a previous error recovery operation. If yes, then in step S402A, the alternate path is switched to the primary path with shorter timeout duration. In one embodiment, a threshold timer value may be set to change from the second path to the first path. The threshold timer value may be used to determine the duration for which the second path has been used. If the second path usage duration exceeds the threshold value, then the second path is switched and instead, the first path is used. The threshold value may be stored in memory 121D (FIG. 1B).

If the alternate path is not being used in step S402, the process moves to step S403.

Step S403 to S410 are similar to steps S303 to S310 that are described above with respect to FIG. 3B.

The process flow diagram of FIG. 4 allows one to reset the alternate path (longer timeout duration) to the default primary path with shorter timeout duration. This helps overall latency because the primary path is used most of the time and the alternate path is only used when more time may be needed for error recovery.

In one embodiment, an optimum solution is provided to maintain low latency and a higher recovery time, when a higher error recovery time is needed.

Although the present invention has been described with reference to specific embodiments, these embodiments are illustrative only and not limiting. Many other applications and embodiments of the present invention will be apparent in light of this disclosure and the following claims.

What is claimed is:

1. A method for transferring a packet in an Infiniband network, comprising:
   configuring a connection to connect a first network device to a second network device in the Infiniband network using a first path with a first packet timeout duration value and a second path with a second packet timeout duration value, the first packet timeout duration value being less than the second packet timeout duration value;
   attempting to transfer the packet using the first path; and
   using the second path to transfer the packet if a number of retries for transferring the packet using the first path exceeds a maximum number of retries for the first path, wherein the first path and the second path are a same path that operate at the first packet timeout duration value and the second timeout packet duration value.

2. The method of claim 1, further comprising:
   changing from the second path to the first path, after the second path has been used to transfer packets for a certain duration.

3. The method of claim 1, wherein a host channel adapter driver for the first network device is configured to include the first packet timeout duration value and the second packet timeout duration value.

4. The method of claim 1, wherein an application executed in the first network device configures the first path and the second path.

5. The method of claim 1, wherein the maximum number of retries for the first path is seven or less.

6. The method of claim 1, wherein the first network device includes a host channel adapter to communicate with an Infiniband fabric.

7. A system used in an Infiniband network for transferring packets, comprising:
   a first network device coupled to the Infiniband network;
   a second network device coupled to the Infiniband network; and
   an application executed at the first network device that configures a connection to connect the first network device to the second network device in the Infiniband network using a first path with a packet timeout duration value and a second path with a packet timeout duration value, the packet timeout duration value of the first path being less than the packet timeout duration value of the second path; wherein the first network device attempts to transfer a packet to the second network device using the first path; and uses the second path to transfer the packet if a number of retries using the first path exceeds a maximum number of retries for the first path, wherein the first path and the second path are a same path that operate at the first packet timeout duration value and the second timeout packet duration value.

8. The system of claim 7, wherein the first path is re-selected after the second path has been used to transfer packets for certain duration.

9. The system of claim 7, wherein a host channel adapter driver for the first network device is configured to include the first packet timeout duration value and the second packet timeout duration value.

10. The system of claim 7, wherein the maximum number of retries for the first path is seven or less.

11. The system of claim 7, wherein the first network device includes a host channel adapter to communicate with the Infiniband network.

12. A method for transferring a packet in an Infiniband network, comprising:
    configuring a connection to connect a first network device to a second network device in the Infiniband network using a first path with a packet timeout duration value and a second path with a packet timeout duration value, the packet timeout duration value of the first path being less than the packet timeout duration value of the second path; and the first path and the second path are the same except for the packet timeout duration values;
    attempting to transfer the packet using the first path;
    using the second path to transfer the packet if a number of retries using the first path exceeds a maximum number of retries for the first path; and
    changing from the second path to the first path, after the second path has been used to transfer packets for a certain duration.

13. The method of claim 12, wherein a host channel adapter driver for the first network device is configured to include the first path timeout duration value and the second path timeout duration value.

14. The method of claim 12, wherein an application executed in the first network device configures the first path and the second path.

15. The method of claim 12, wherein the maximum number of e-tries for the first path is seven or less.

16. The method of claim 13, wherein the first network device includes a host channel adapter to communicate with the Infiniband network.

17. A method for transferring a packet in a network, comprising:

configuring a connection to connect a first network device to a second network device in the network using a first path with a first packet timeout duration and a second path with a second packet timeout duration, the first packet timeout duration being less than the second packet timeout duration; wherein the first path and the second path use a same path that operates using different timeout durations;

attempting to transfer the packet using the first path; and using the second path to transfer the packet if a number of retries for transferring the packet using the first path exceeds a maximum number of retries for the first path.

18. The method of claim 17, further comprising:

changing from the second path to the first path, after the second path has been used to transfer packets for a certain duration.

\* \* \* \* \*

UNITED STATES PATENT AND TRADEMARK OFFICE
CERTIFICATE OF CORRECTION

| | | |
|---|---|---|
| PATENT NO. | : 7,822,028 B1 | Page 1 of 1 |
| APPLICATION NO. | : 11/867849 | |
| DATED | : October 26, 2010 | |
| INVENTOR(S) | : Todd M Rimmer | |

It is certified that error appears in the above-identified patent and that said Letters Patent is hereby corrected as shown below:

In column 1, line 17, delete "includi" and insert -- including --, therefor.

In column 1, line 27, delete "IS" and insert -- IB --, therefor.

In column 1, line 59, delete "times," and insert -- 7 times, --, therefor.

In column 1, line 67, after "network" insert -- is --.

In column 3, line 35, delete "10Q" and insert -- 109 --, therefor.

In column 4, line 10, after "switches" insert -- 125, --.

In column 4, line 43, after "and" insert -- 7 --.

In column 4, line 61, delete "121F" and insert -- 121E --, therefor.

In column 6, line 34, after "the packet" insert -- is --.

In column 7, line 14, delete "ternate" and insert -- the alternate --, therefor.

In column 9, line 5, in claim 15, delete "e-tries" and insert -- re-tries --, therefor.

Signed and Sealed this
Twenty-fifth Day of January, 2011

David J. Kappos
*Director of the United States Patent and Trademark Office*